3,138,369
BLENDING APPARATUS
Richard J. Bennett and William A. Keene, Bartlesville, Okla., assignors to Phillips Petroleum Company, a corporation of Delaware
Filed Dec. 7, 1962, Ser. No. 242,945
7 Claims. (Cl. 259—95)

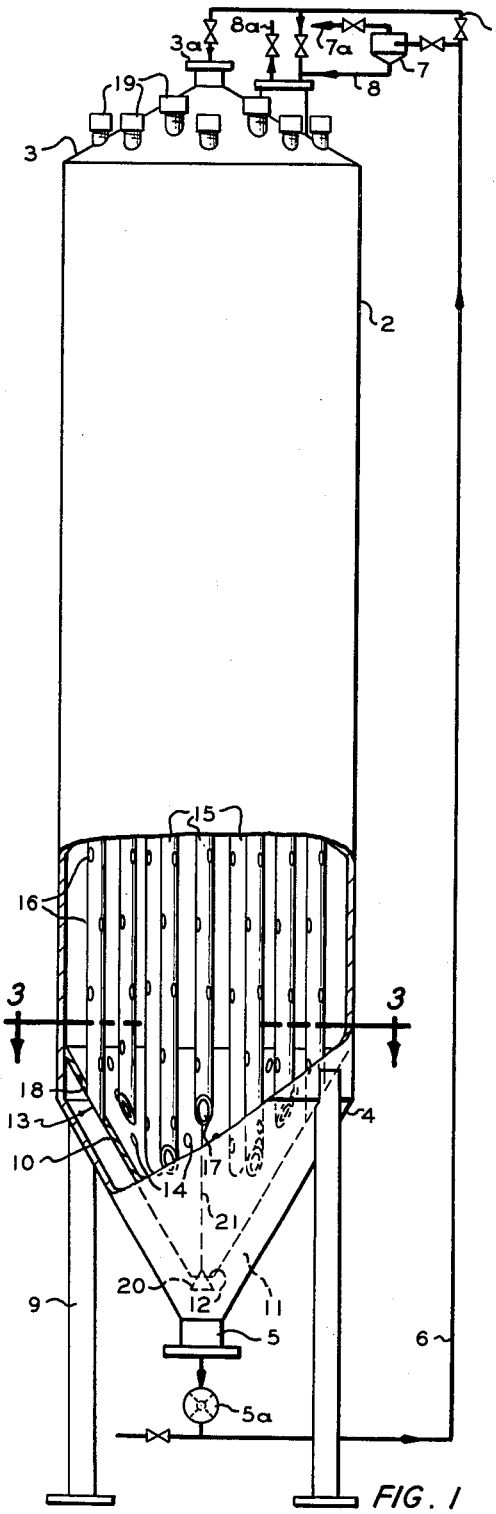
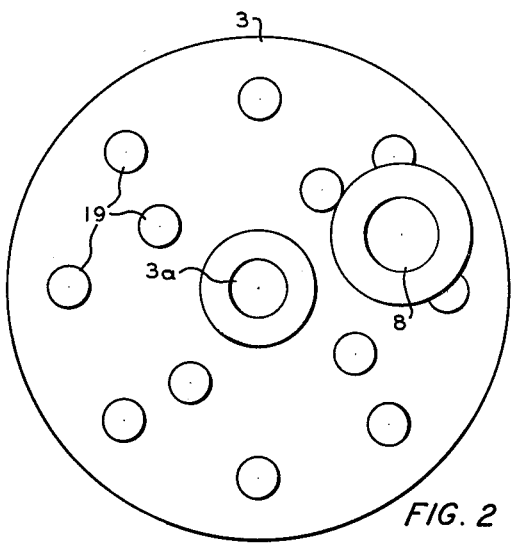
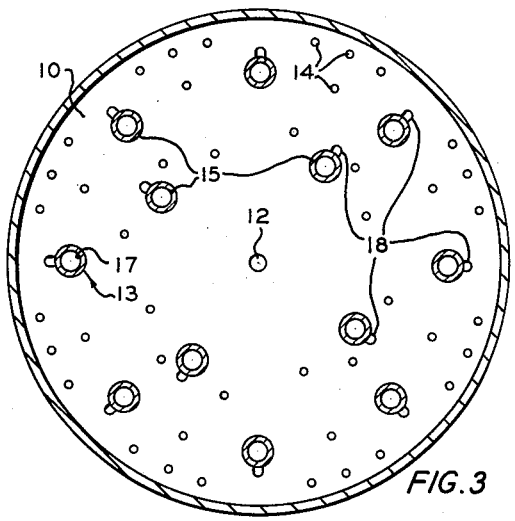
FIG. 1
FIG. 2
FIG. 3
INVENTORS
R.J. BENNETT
W.A. KEENE
BY
Young & Quigg
ATTORNEYS

This invention relates to the blending or homogenization of flowable particulate solids. In one aspect it relates to an improved apparatus for effecting such blending.

In the prior art, it is known to homogenize or blend a heterogeneous mass of particulate flowable solids by establishing a bed or mass of such solids, withdrawing material from at least two different elevations in such mass or bed, mixing the withdrawn materials together and conveying the resulting mixture into an upper level in said mass or bed. This type of operation and apparatus is illustrated in United States Patent 3,029,986 (1962). The general principle has found application in many types of processes, some of which are chemical processes wherein a product is produced in solid particulate form over a long period of time and variations in reaction conditions, catalyst activity, and purity of charge materials result in relatively minor, but detectable, variations in the properties of the final product. Thus, in the production of thermoplastic materials in a polymerization process wherein the product of the manufacturing plant is in the form of small particles or pellets, some properties of the product vary over a period of time as a result of varying reaction conditions. When the product is stored, for example, in a large tank or storage bin, the properties of the product withdrawn from one level in said tank or bin will be slightly different from the properties of a portion withdrawn from a different level. This variation tends to complicate meeting or guaranteeing of specifications on the product. This situation can be remedied by mixing and homogenizing the mass of particulate material. Unfortunately, apparatus used in the past for this purpose has been relatively inefficient and the homogenization or blending of the products, particularly in large quantities, e.g. of the order of several hundred thousand pounds, has been unduly costly.

In accordance with this invention, it has been found that solids-blending apparatus of the type described is improved in efficiency by providing a perforate floor member in a blending tank and attaching to said floor member at least one upwardly extending conduit which establishes a passageway or conduit from an upper level in the tank through the floor member and at the same time providing an additional perforation in the floor member to which a shorter conduit or passageway, or no upwardly extending conduit, is attached, so that material is withdrawn from different elevations in the tank and passed through the floor member into an outlet in the bottom of the tank wherein the two or more withdrawn portions of material are mixed and are subsequently returned to an upper level in the tank. Further in accordance with this invention, it has been found that additional improvement is effected by eliminating the stagnation, stacking or accumulation of solid material against the upright conduits at their uppermost level of joinder with the floor member. Such stacking or accumulation can be eliminated by providing slots in the floor member or fillets attached to the upright conduit at the locus described.

An object of this invention is to improve the blending of solids, particularly in large quantities. Another object of the invention is to provide improved and economical apparatus for the blending of particulate solids. An additional object is to increase the efficiency of blending of flowable particulate solid material. Other objects and advantages will become apparent to those skilled in the art upon consideration of this disclosure.

The accompanying drawing illustrates one specific embodiment of this invention.

FIGURE 1 is an elevation, partly in section, of an apparatus in accordance with this invention.

FIGURE 2 is a plan view of the apparatus shown in FIGURE 1.

FIGURE 3 is a sectional plan view taken along line 3—3 of FIGURE 1.

According to this invention, there is provided a solids-blending apparatus comprising, in combination: an upright chamber having a bottom outlet; an upwardly concave floor member in a lower part of said chamber and spaced from the bottom thereof; at least one upright conduit positioned within said chamber to provide a passageway through said floor member; at least one opening in each such conduit at a level above said floor member; at least one opening in said floor member spaced from said conduit; and means for conveying particulate solids from said outlet to the upper interior of said chamber.

The apparatus illustrated in FIGURE 1 comprises an upright cylindrical tank 2 having a conical top closure member 3 with an access opening 3a, and a conical bottom 4 provided with an outlet 5, in which is star valve 5a. Attached to the outlet is a pneumatic conveyor 6 through which particulate material withdrawn from outlet 5 is pneumatically elevated into cyclone separator 7 and returned through eccentric inlet 8 into the upper interior of the tank 2. Tank 2 is supported on legs 9. Carrier gas, from a source not shown, is supplied through the inlet of pneumatic conveyor 6 and is withdrawn through outlet 7A. Alternatively, cyclone 7 can be by-passed, as by conduit 6a, and the solids returned to the upper part of tank 2 through opening 3a and/or 8, the upper tank space acting to separate solids from carrier gas, which can escape through outlet 8a. Since pneumatic conveyors are well known in the art, no further detailed illustration of this member is necessary at this point.

Within tank 2 is a perforate conical floor member 10 spaced from tank bottom 4 and conforming generally to the shape thereof, thus defining a collecting and blending chamber 11. Floor member 10 is provided with an apex opening 12, holes 13 and openings 14 which are spaced from holes 13. Fitted into holes 13 are upright conduits or tubes 15 having openings 16 in their side walls. Conduits 15 are illustrated as being closed at the top and secured to top closure 3, as by welding, and further provided with removable caps 19 for inspection and cleaning. However, conduits 15 can be fastened to closure member 3 to abut against the same and thus be closed by closure member 3. Alternatively, these conduits need not extend as far as closure member 3 and can be open at their tops if desired. Any number of openings 16 can be provided consistent with adequate structural strength and free fall of material into said conduits, so that the latter are not filled with solids during operation.

The use of openings 60° apart circumferentially, in a helical pattern along the tube walls, constitutes a satisfactory arrangement. These openings are, of course, sufficiently large to admit and allow flow of the particles of solid material which are to be blended in tank 2.

From the foregoing description, it will be seen that when tank 2 is filled by a bed of contiguous flowable solid particles to about 35 to 100 percent of its capacity, for example, the particulate solids can flow through openings 16, as well as openings 12 and 14, into collecting and blending chamber 11 and out through outlet 5. Thence the materials are elevated in pneumatic conveyor 6 and returned to the top of the bed in tank 2. Thus materials are drawn from different elevations and positions in the bed or mass, are mixed together in chamber 11, and returned to the top of the mass of material inside tank 2 so that efficient and rapid mixing and homogenization occur.

FIGURE 3 illustrates one configuration of holes 13 in floor member 10. The invention is not limited to this particular configuration; a completely symmetrical configuration of holes is also within the scope of the invention. As illustrated in FIGURE 3, hole 13 comprises a generally circular main opening 17 and a slot 18 continuous therewith.

FIGURE 1 shows the positioning of upright conduit 15 in opening 17, leaving open slot 18.

From FIGURES 1 and 3, it will be seen that immediately adjacent the highest level of joinder of conduits 15 with floor member 10, there is provided a slot through which material can flow, from a position immediately adjacent the bottoms of conduits 15, through floor member 10 into space 11, thus preventing the accumulation of material adjacent the highest level of joinder of conduits 15 with floor member 10. This feature of the present invention increases the efficiency of mixing and prevents lodging of material adjacent conduits 15, thus minimizing need for mechanical cleanout procedures.

Further, as illustrated in FIGURES 1 and 3, openings 17 encompass conduits 15 to more than 180°, but not all, of their circumference. Subject to this limitation, slots 18 can be of suitable size and configuration to admit controlled flow of particulate solids therethrough. In place of slots 18, fillets, which substantially fill the space which would otherwise be filled by bridged solids, can be substituted if desired. Slots, however, are more effective.

FIGURE 1 further illustrates the joinder of conduits 15 to floor member 10 and the relative positions of openings 17 and slots 18, which extend upwardly from conduits 15 along elements of conical floor member 10. Joinder of conduits 15 to floor member 10 is satisfactorily accomplished by welding. However, as will be evident to those skilled in the art, any type of joinder, such as threading, can be used.

FIGURE 2 illustrates the joinder of conduits 15 to top closure 3. As specifically illustrated in this figure, conduits 15 are provided with removable cap members 19 for cleaning and inspection. Here again, any desired type of joinder known in the art can be utilized, e.g. welding of conduits 15 to closure member 3.

The optimum number of conduits 15, the optimum size of openings 16, and the optimum vertical spacing of openings 16 depend on the particle size and the intrinsic properties of the solids to be blended, and can readily be determined by routine test. However, the size of openings 12, 14 and 16 and the inside diameter of conduits 15 are so chosen, in comparison with the operation of valve 5a, that little or no material accumulates in chamber 11. In other words, chamber 11 is maintained substantially empty during operation, solids descending into chamber 11 being withdrawn by valve 5a at substantially as rapidly as they enter. This type of operation produces enhanced mixing in chamber 11, since the solid particles falling against conical bottom 4 rebound or bounce through the chamber and are thus mixed with other particles moving in the same manner. Also, it facilitates release of any conveying gas which may leak upwardly through valve 5a.

We have found that efficient mixing of pelleted solid polymers of ethylene is obtained when 70 to 80 percent of the solids delivered into chamber 11 are delivered through conduits 15, 10 to 20 percent through the openings in floor member 10, and not more than 10 percent through apex opening 12.

Apex opening 12 can be comparable in size to openings 14. Alternatively, it can be made much larger to facilitate cleaning. In such a case, a valve 20 suspended from the top of the tank by cable 21 can be used to restrict the apex opening during operation and enlarge it for cleaning.

While the invention has been described in relation to a specific, presently preferred form, the invention is not limited to the specific embodiment illustrated. Thus the various openings and passageways need not be circular in cross-section. The invention, moreover, is not limited to the specific number or spacings of openings illustrated. Furthermore, a bucket elevator can be substituted for the pneumatic conveyor. The conveyor, regardless of type, can be positioned outside or inside tank 2.

We claim:
1. Solids blending apparatus comprising, in combination:
   (a) a chamber having a bottom outlet;
   (b) a floor member in a lower part of said chamber and spaced from the bottom of said chamber;
   (c) at least one upwardly extending conduit positioned within said chamber to provide a passageway through said floor member;
   (d) at least one opening in each such conduit at a level above said floor member;
   (e) at least one opening in said floor member spaced from said conduit; and
   (f) means for conveying particulate solids from said outlet to the upper interior of said chamber.

2. Solids blending apparatus comprising, in combination:
   (a) an upright chamber having a bottom outlet;
   (b) an upwardly concave floor member in a lower part of said chamber and spaced from the bottom of said chamber;
   (c) at least one upright conduit positioned within said chamber to provide a passageway through said floor member;
   (d) at least one opening in each such conduit at a level above said floor member;
   (e) at least one opening in said floor member spaced from said conduit; and
   (f) means for conveying particulate solids from said outlet to the upper interior of said chamber.

3. Solids blending apparatus comprising, in combination:
   (a) an upright cylindrical tank having a conical bottom, an outlet in said bottom, and top closure means;
   (b) a perforate conical floor member positioned in a lower part of said tank, being spaced above said bottom and conforming generally to the shape thereof, thus forming a collecting chamber below said floor member in the bottom of said tank;
   (c) a plurality of upright conduits within said tank, attached to said floor member and forming passageways therethrough into said collecting chamber;
   (d) openings in the side wall of each such upright conduit at different elevations therein;
   (e) openings in said floor member, spaced from said upright conduits; and
   (f) a gas lift adapted to convey particulate solids from said outlet into the top of said tank.

4. Apparatus according to claim 3 wherein said floor member has an opening at its apex, and aforementioned openings in said floor member are spaced at different elevations from the apex opening and from each other.

5. Apparatus according to claim 3 wherein said upright conduits are fitted into holes in said floor member which conform to the shape of said conduits through more than 180°, but not all, of their circumference and, continuous with said holes at their points of greatest elevation, are slots through said floor member, extending upwardly along elements thereof.

6. Solids blending apparatus comprising, in combination:
   (a) a chamber having a bottom outlet;
   (b) a floor member in a lower part of said chamber and spaced from the bottom of said chamber;
   (c) at least one upwardly extending conduit positioned within said chamber to provide a passageway through said floor member;
   (d) at least one opening in each conduit at a level above said floor member; and
   (e) at least one opening in said floor member spaced from said conduit.

7. Apparatus according to claim 6 wherein said upright conduits are fitted into holes in said floor member which conform to the shape of said conduits through more than 180°, but not all, of their circumference and, continuous with said holes at their points of greatest elevation, are slots through said floor member, extending upwardly along elements thereof.

References Cited in the file of this patent
UNITED STATES PATENTS

| | | |
|---|---|---|
| 1,160,848 | Conklin | Nov. 16, 1915 |
| 2,386,419 | Auer | Oct. 9, 1945 |
| 3,029,986 | Horn | Apr. 17, 1962 |